Figure 1:
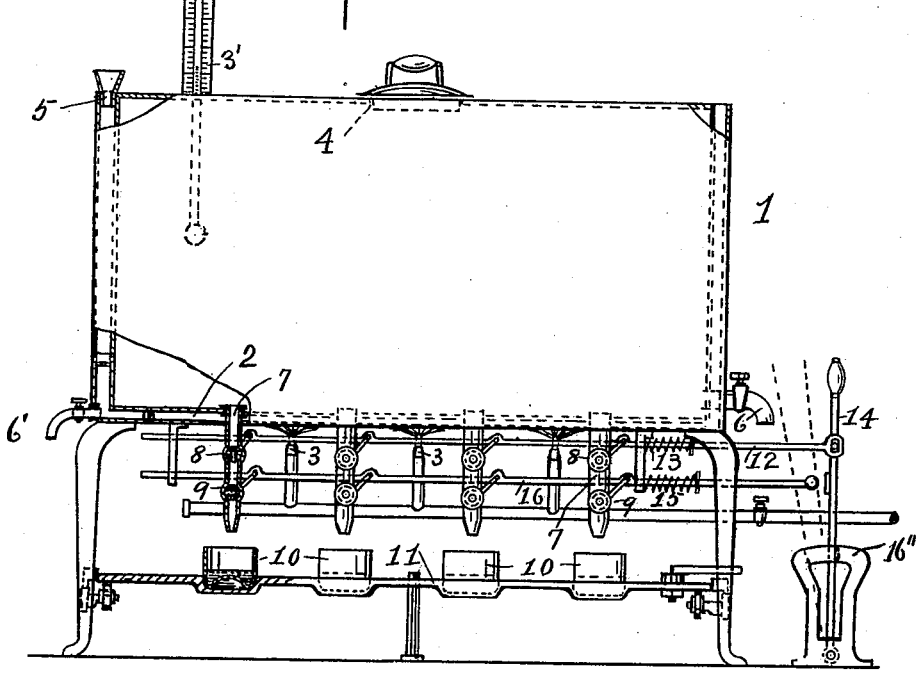

No. 615,725.  P. LINDEMEYR.  Patented Dec. 13, 1898.
ART OF AND APPARATUS FOR INTRODUCING AND SECURING PACKING IN BOTTLE CAPS.
(Application filed Oct. 25, 1897.)
(No Model.)

Witnesses
C. M. Catlin.
M. H. Ball

Inventor
Philip Lindemeyr
by Benj. R. Catlin
Attorney

THE NORRIS PETERS CO., PHOTO-LITHO., WASHINGTON, D. C.

UNITED STATES PATENT OFFICE.

PHILIP LINDEMEYR, OF BALTIMORE, MARYLAND, ASSIGNOR TO THE MONARCH MANUFACTURING COMPANY OF BALTIMORE CITY.

ART OF AND APPARATUS FOR INTRODUCING AND SECURING PACKING IN BOTTLE-CAPS.

SPECIFICATION forming part of Letters Patent No. 615,725, dated December 13, 1898.

Application filed October 25, 1897. Serial No. 656,298. (No model.)

*To all whom it may concern:*

Be it known that I, PHILIP LINDEMEYR, a resident of Baltimore, in the State of Maryland, have invented certain new and useful Improvements in the Art of and Apparatus for Introducing and Securing Packing in Bottle-Caps; and I do hereby declare the following to be a full, clear, and exact description of the invention, such as will enable others skilled in the art to which it pertains to make and use the same.

The invention relates to the sealing of bottle-caps.

Bottle-caps are in some cases sealed or packed each with a disk of wax or plastic composition placed in the bottom of the cap and covered on the side next the bottle-mouth with parchment-paper. The wax has been spread in thin sheets, from which disks were cut of a size and form to fit or nearly fit the cap. These wax disks have been placed by hand in the caps, and disks of parchment-paper were then placed upon the disks of wax. The method is slow and difficult and is made particularly so by the plastic and adhesive nature of the main material, which is of a character not unlike shoemakers' wax. Such material is liable to adhere to the tools used in forming or cutting or handling the disks, to the fingers of the operator, and to the side wall of the cap; and, further, when finally and properly placed in the cap its adhesion thereto or the adhesion of the parchment-paper to the wax has proved insufficient for the best results. The wax layer introduced into the cap is a thin disk and rests when properly placed on its bottom, and the fact that the disks are thin renders it more difficult to manipulate them for their introduction, and it aggravates the evils of sticking above described, and, besides, it necessitates a suitable method of determining the thickness of such layer and requires that the material shall be accurately gaged. This could be done were the disks cut from a sheet, as heretofore attempted, which sheets could be made the proper thickness; but such method is objectionable in using material such as contemplated herein because of its liability during its manipulation to adhere to various objects, including the sides of the cap.

The present improvement has for its objects to provide suitable means for placing a thin disk of wax or the like of definite thickness in the bottom of the cap and to avoid the objections above noted.

The invention consists in the improvements in the art and apparatus hereinafter described and pointed out.

Figure 2:
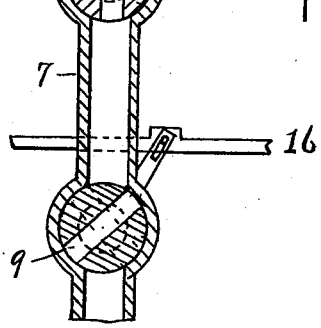
Figure 3:
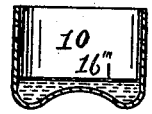
Figure 4:
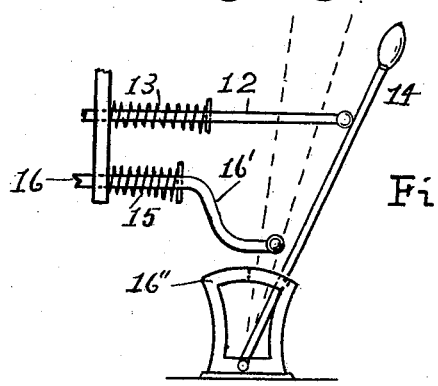

In the accompanying drawings, Figure 1 is a side elevation, partly broken, of apparatus for melting wax and introducing it in the melted state in measured quantities into a plurality of bottle-caps. Fig. 2 is an enlarged section of a measuring and discharging pipe. Fig. 3 is an enlarged section of a cap having a wax packing covered with parchment-paper, and Fig. 4 shows a modification of the valve-operating rods and handle.

In carrying out the improvement the wax or waxy compound is melted and maintained in fluid condition and introduced into the caps in that state and in measured quantities, and it is covered in the caps by parchment-paper while it (the wax) is in a fluid or semifluid state and while, therefore, it is in condition to cause adhesion of the parchment-paper cover and also adhesion to the proper region of the cap.

In the drawings, which illustrate apparatus suitable for practicing the improvement in the art, numeral 1 denotes a wax-melting vessel having, preferably, a double bottom to provide a water-space 2, whereby hot water or steam can be used as a heating medium. By the use of water or steam the temperature can be regulated in well-known manner and the accidental overheating or burning of the wax avoided.

In the present illustration, 3 denotes a gas-burner to heat the water and mediately melt the wax. These burners are preferably placed adjacent the tubes by which the contents of the wax-melting vessel are discharged, so that the hot products of combustion heat such tubes directly. The heated fluid contents of the space in the double bottom also heat said tubes, and it is important to maintain their heat because of the smallness of the valve-passages and because of the small quantity of each discharge necessary to simply cover the bottom of the caps.

3' is a thermometer.

4 is a charging-opening for introducing the material or materials into the receptacle 1.

5 denotes a pipe for supplying water or steam to the water-chamber, and 6 and 6' are draw-off cocks communicating with the receptacle and the water-chamber, respectively.

7 indicates pipes to discharge melted wax from the vessel or box 1 into the caps. Each pipe is provided with upper and lower cocks or valves 8 and 9 and is adapted to contain between said cocks a suitable quantity for packing a single cap.

The caps 10 to be filled are placed in concavities or seats formed in a tray 11 and so disposed that when the tray is placed in proper position, determined by suitable stops, each cap will be immediately under a cap-charging pipe 7.

The upper cocks or valves 8 are connected to an operating-rod 12, whereby they may be simultaneously closed. They are normally held open by the spring 13.

14 is a lever connected to rod 12 and adapted to move it to close the cocks 8 and compress spring 13. When the lever 14 is released, the spring returns it and opens the said cocks 8. The cocks 9 are normally held closed by a spring 15, acting on a cock or valve opening rod 16. They are simultaneously opened by a rod 16, connected to each and situated in the path of lever 14. The parts are so arranged and combined that when the lever 14 is moved to close the upper cocks by means of rod 12 the lever immediately thereafter moves rod 16 and opens cocks 9, whereby the material contained in each pipe between the cocks is discharged into a cap seated thereunder. When the lever 14 is released, it is moved away from rod 16, whereupon the spring 15 closes the cocks 9, their closing being effected before cocks 8 are open to permit the descent of another charge into each pipe. By this construction the exact quantity required for each cap is first received into the pipe and then cut off from the reservoir and subsequently dropped into the cap. Means for thus precisely measuring each charge are important in view of the small quantity required in each cap and the impracticability of diverting or disposing of a superfluity of discharged material.

It will be understood that the upper cocks are preferably opened and held open solely by the spring 13 and that the lower cocks are closed by spring 15 and that the lever 14 and bars or rods 12 and 16 have such situation and length that spring 13 is first compressed and then spring 15. To insure this order of operation, the rod 16 might simply be made shorter than rod 12; but to avoid the necessity of a very nice and difficult regulation of the comparative lengths of these rods and consequent small path of the lever the rod 16 is bent downwardly at 16', Fig. 4, to engage the lever nearer its fulcrum, substantially as indicated. The lever can be so supported on its fulcrum, if desired, as to fall, when free, away from the rods by gravity. 16'' indicates a lever-guide which limits its movement.

The caps having been charged with fluid wax, parchment-paper disks 16''' of proper size and form are placed within the caps and upon the wax and immediately, by preference, before the wax has congealed, whereby the adhesion of the wax and paper is secured. The molten state of the wax insures the expulsion of air from beneath it in the cap and a suitable degree of adhesion of the packing to the cap.

It is characteristic of my improvement that the wax is melted and measured in a melted state and that its melted and fluid state is maintained until it is deposited in the bottom of the caps, which results are conveniently and certainly secured by drawing the wax directly from the melting vessel into measuring-receptacles and directly from said receptacles into the caps, said caps, measuring-receptacles, and the wax-melting reservoir being situated in close relation to each other, whereby undue exposure of pipes and vessels to the atmosphere is avoided and whereby the heat of the reservoir maintains by conduction and radiation the heat of said pipes and other devices. These or equivalent means of maintaining fluidity are important on account of the small quantities measured and deposited on the bottoms of the inverted caps.

It is further characteristic of my improvement that in the apparatus having the functions described the means for heating wax-supply also directly heat the discharge-tubes.

Having described my invention, what I claim is—

1. In the art of placing a thin wax packing in the bottom of bottle-caps, melting a mass or supply of wax, successively measuring suitably small quantities of melted wax, charging the melted and measured portions into the caps, maintaining the heat of the wax-supply, and also maintaining the heat of the measured portions thereof above that of the atmosphere by the direct application of a heating fluid to the measuring devices and by conduction and radiation from the melted supply to insure constant fluidity of the wax, substantially as described.

2. In an apparatus for placing a thin layer of wax packing in the bottom of bottle-caps, the combination of a wax-melting vessel, discharge-tubes connected immediately to the said vessel and directly beneath its bottom and provided with wax-measuring devices closely adjacent said bottom, means for supporting caps in close relation to the measuring devices, and means for maintaining the heat of the mass of melted wax, said means being also adapted to directly and continuously heat the discharge-tubes, the discharge-tubes and measuring devices being defended from ascending air-currents by the vessel-bottom and by heat radiated therefrom and from its contained mass of molten wax, substantially as described.

3. In an apparatus for depositing a liquid in a receptacle, the combination of a vessel adapted to hold a suitable quantity of the liquid, a discharge-tube leading from the vessel and having two cocks or valves with an intermediate measuring-space, a spring independently holding the upper valve open, a spring independently holding the lower closed, means for closing the upper valve while the lower valve remains closed and at rest, said means being adapted to actuate devices for closing the lower valve after the upper valve has been closed and is at rest, substantially as described.

4. The apparatus for charging bottle-caps with wax in a molten state consisting of a vessel, means for heating the contents of the same, a discharge-pipe having two cocks or valves, means for closing the upper valve, said means being operative by their continued action to open the lower valve upon the closing of the upper valve, the said means comprising a lever connected to the upper valve to close the same, a spring to open said valve, an intermediate device whereby the lever upon closing the upper valve opens the lower and a spring to close the lower valve when released from the lever, substantially as described.

5. In an apparatus for depositing a liquid in a receptacle, the combination of a vessel adapted to hold a suitable quantity of the liquid, a discharge-tube having two cocks or valves and an intermediate measuring-space, a device for independently holding the upper valve open, a device for independently holding the lower valve closed, means to independently close the upper valve and adapted after closing it to open the lower one, said lower valve remaining closed and at rest until after the upper one is closed, substantially as described.

In testimony whereof I have signed this specification in the presence of two subscribing witnesses.

PHILIP LINDEMEYR.

Witnesses:
FRANK D. BLACKISTONE,
BENJ. R. CATLIN.